United States Patent
Rahman

[19]

[11] Patent Number: 5,933,777
[45] Date of Patent: Aug. 3, 1999

[54] SYSTEM AND METHOD FOR ALLOCATING CHANNEL ELEMENTS IN A CODE DIVISION MULTIPLE ACCESS RADIO TELECOMMUNICATIONS NETWORK

[75] Inventor: Mohamed Anisur Rahman, Randolph, N.J.

[73] Assignee: Telefonaktiebolaget LM Ericsson (publ), Stockholm, Sweden

[21] Appl. No.: 08/847,432

[22] Filed: Apr. 24, 1997

[51] Int. Cl.$^6$ .............................. H04Q 7/00; H04J 3/06
[52] U.S. Cl. ...................... 455/450; 455/437; 455/439; 455/452; 370/322; 370/335; 370/342
[58] Field of Search ..................... 455/432, 436, 455/437, 439, 447, 450, 452, 453, 521, 525, 62, 464; 370/332, 335, 342, 328, 320, 329, 337, 347, 441, 442, 341

[56] References Cited

U.S. PATENT DOCUMENTS

| | | | |
|---|---|---|---|
| 4,204,093 | 5/1980 | Yeh | 370/95 |
| 4,638,476 | 1/1987 | Acampora et al. | 370/83 |
| 4,788,679 | 11/1988 | Kataoka et al. | 370/60 |
| 5,101,501 | 3/1992 | Gilhousen et al. | 455/33 |
| 5,109,390 | 4/1992 | Gilhousen et al. | 375/1 |
| 5,265,119 | 11/1993 | Gilhousen et al. | 375/1 |
| 5,267,261 | 11/1993 | Blakeney, II et al. | 375/1 |
| 5,278,827 | 1/1994 | Pound | 370/84 |
| 5,278,892 | 1/1994 | Bolliger et al. | 379/60 |
| 5,329,635 | 7/1994 | Wadin et al. | 455/33.2 |
| 5,341,396 | 8/1994 | Higgins et al. | 375/1 |
| 5,375,140 | 12/1994 | Bustamante et al. | 375/1 |
| 5,416,797 | 5/1995 | Gilhousen et al. | 375/705 |
| 5,432,842 | 7/1995 | Kinoshita et al. | 379/60 |
| 5,442,625 | 8/1995 | Gitlin et al. | 370/18 |
| 5,446,756 | 8/1995 | Mallinckrodt | 375/200 |
| 5,485,486 | 1/1996 | Gilhousen et al. | 375/205 |
| 5,586,170 | 12/1996 | Lea | 455/452 |
| 5,754,541 | 5/1998 | Glisic et al. | 370/335 |
| 5,757,772 | 5/1998 | Thornberg et al. | 370/236 |
| 5,778,320 | 10/1996 | Drozt et al. | 455/452 |
| 5,781,861 | 9/1996 | Kang et al. | 455/442 |
| 5,828,659 | 8/1996 | Teder et al. | 455/67.6 |

FOREIGN PATENT DOCUMENTS

| | | |
|---|---|---|
| 0 600 713 A2 | 6/1994 | European Pat. Off. . |
| 0 680 159 A2 | 11/1995 | European Pat. Off. . |
| WO 95/35637 | 12/1995 | WIPO . |

*Primary Examiner*—Dwayne D. Bost
*Assistant Examiner*—Jean A. Gelin
*Attorney, Agent, or Firm*—Smith & Danamraj, P.C.

[57] ABSTRACT

A method and system for allocating channel elements in a code division multiple access (CDMA) radio telecommunications network is disclosed. The method begins by a contribution assessor determining a candidate set of base stations having sufficient signal strength with the entering mobile station to establish a voice channel. Next, the contribution assessor measures the signal strength between each base station of the candidate set of base stations and the operating mobile stations served by each of the base stations. The contribution assessor determines which base station of the candidate set of base stations has the weakest signal strength with one of its served operating mobile stations. Then, a load processor reallocates a channel element away from the mobile station having the weakest signal strength to the entering mobile station.

13 Claims, 5 Drawing Sheets

SYSTEM AND METHOD FOR ALLOCATING CHANNEL ELEMENTS IN A CODE DIVISION MULTIPLE ACCESS RADIO TELECOMMUNICATIONS NETWORK

BACKGROUND OF THE INVENTION

1. Technical Field of the Invention

This invention relates to radio telecommunication systems and, more particularly, to a system and method for dynamically reallocating channel elements in a loaded code division multiple access (CDMA) radio telecommunications network.

2. Description of Related Art

In radio telecommunications networks, a wide variety of services such as voice, video, data, and image services are available to subscribers. In using these radio telecommunications networks, the most precious resource is the radio spectrum. To maximize the effectiveness of the networks, code division multiple access (CDMA) has been developed to facilitate communications involving a large number of system users. There are other multiple access communication system techniques, such as time division multiple access (TDMA) and frequency division multiple access (FDMA), however, the spread spectrum modulation technique of CDMA has proven to offer many advantages over the other methods.

In a CDMA system, a unique binary spreading sequence, known as a code, is assigned for each call of each user. Multiplied by the assigned code, the user's signal is spread onto a channel bandwidth wider than the user signal bandwidth. The ratio of the system channel bandwidth to the user's bandwidth is known as the "spreading gain." All active users share the same system channel bandwidth frequency spectrum at the same time. The signal of each user is separated from the other users' signals at the receiver by issuing a correlator keyed with the associated code sequence to "de-spread" the desired signal. In this manner, an increased number of simultaneous users can be served.

In addition to serving an increased number of users, the CDMA system uses the technique of macro-diversity to improve the quality of the reception in the radio telecommunications network. The macro-diversity technique involves the use of two or more simultaneous links from two or more cells or base stations to a single mobile station in order to improve the quality or performance of the reception of the radio signal. The mobile station receivers both employ a number of correlators. Receivers using parallel correlators, which are sometimes called rake receivers, allow individual path arrivals to be tracked independently and the sum of their received signal strengths is then used to demodulate the signal. While there is fading on each path arrival, the fading is independent of one another. Demodulation based on the sum of the signals becomes much more reliable using the macro-diversity mode. However, by employing the macro-diversity mode, more resources of the base station are used. In addition, most calls will take place in the macro-diversity mode. Therefore, by the use of the macro-diversity mode, there is a greater likelihood of overloading the radio telecommunications network.

There are disadvantages in the existing system. Although the CDMA system using the macro-diversity mode provides for a clearer reception of radio telecommunication signals, a large amount of resources is used. There may arise a situation where services are needed for additional users, such as emergency calls. At present, there is no method for allowing additional users into the radio telecommunications network when the network has reached full capacity.

Although there are no known prior art teachings of a solution to the aforementioned deficiency and shortcoming such as that disclosed herein, prior art references that discuss subject matter that bears some relation to matters discussed herein are U.S. Pat. No. 5,278,892 to Bollinger et al. (Bollinger), U.S. Pat. No. 5,267,261 to Blakeney, II et al. (Blakeney), and U.S. Pat. No. 5,101,501 to Gilhousen et al. (Gilhousen).

Bollinger discloses a CDMA cellular system comprising a communications network that interconnects cells with each other and with the public telephone network. Bollinger describes a call processing arrangement, in a CDMA network, permitting an interface with the public telephone network. However, Bollinger does not teach or suggest a method or system for accommodating additional users in a CDMA system in a macro-diversity mode.

Blakeney, discloses a CDMA system in which a mobile station user communicates with another system user via at least one base station, where each base station transmits a common pilot signal of a different code phase with respect to other base stations in the system. The mobile station monitors the signal strength of pilot signals and reports the measured signal strength to a system controller via the base station through which it is communicating. Command messages from the system controller to a new base station and the mobile station establish communications through the new base station in addition to the communications through the current base station. When the mobile station detects that the signal strength falls below a predetermined level to at least of one of the base stations through which the mobile station is communicating, the mobile station reports the measured signal strength indicative of the corresponding base station to the system controller via the base station through which it is communicating. Command messages are then sent from the system controller to the identified base station and the mobile station terminates communication through the corresponding base station while communication through the other base station continues. Additionally, Blakeney, describes a mobile station-assisted handoff in a CDMA system. But Blakeney does not teach or suggest a method or system for accommodating additional users in a CDMA system in a macro-diversity mode.

Gilhousen discloses a cellular telephone system for directing communications between a mobile user and cell-sites as a mobile user changes cell-site service areas. Gilhousen describes a method and system for providing a soft handoff in a CDMA cellular telephone system. The system includes circuitry responsive to the indication for coupling communications between the mobile user and the other system user via the new cell-site while the mobile user also remains in communication with the system user via the first cell-site. Gilhousen does not teach or suggest a method or system for accommodating additional users in a CDMA system in the macro-diversity mode.

Thus, it would be a distinct advantage to have a system and method for accommodating these additional users in a radio telecommunications network. It is an object of the present invention to provide such a system and method.

SUMMARY OF THE INVENTION

In one aspect, the present invention is a method of dynamically allocating a channel element to an entering mobile station entering a fully loaded coded division multiple access (CDMA) radio telecommunications network having a plurality of base stations serving a plurality of operating mobile stations. The radio telecommunications network utilizes the macro-diversity mode to provide duplicate or triplicate channel elements (transceivers) to each operating mobile station. The method begins with the radio telecommunications network determining a candidate set of base stations having sufficient signal strength with the entering mobile station to establish a channel element. Next, the radio telecommunications network measures a signal strength from each base station of the candidate set of base stations and each operating mobile station served by each base station of the candidate set. Then, the radio telecommunications network determines which base station of the candidate set of base stations has a weakest signal strength with one of its served operating mobile stations. The method then moves on to the radio telecommunications network reallocating a channel element from the served operating mobile station with the weakest signal strength to the entering mobile station.

In another aspect, the present invention is a method of dynamically allocating a channel element for an emergency call to an entering mobile station entering a fully loaded CDMA radio telecommunications network having a plurality of base stations serving a plurality of operating mobile stations. The radio telecommunications network utilizes the macro-diversity mode to provide duplicate channel elements to each operating mobile station. The method begins with the entering mobile station alerting the radio telecommunications network that an emergency call is being originated by the entering mobile station. Next, the radio telecommunications network determines a candidate set of base stations having sufficient signal strength with the entering mobile station to establish a voice channel. Next, the radio telecommunications network measures or obtains information for a signal strength from each base station of the candidate set of base stations and each operating mobile station served by each base station of the candidate set. Then, the radio telecommunications network determines which base station of the candidate set of base stations has a weakest signal strength with one of its served operating mobile stations. This is followed by the radio telecommunications network reallocating a channel element from the served operating mobile station (in the macro-diversity mode) with the weakest signal strength to the entering mobile station without disrupting an ongoing call.

In another aspect of the present invention, the present invention is a system for dynamically allocating a channel element to an entering mobile station entering a fully loaded CDMA radio telecommunications network having a plurality of base stations serving a plurality of operating mobile stations. The radio telecommunications network utilizes macro-diversity to provide duplicate or triplicate channel elements to each operating mobile station. The system comprises means for determining a candidate set of base stations having sufficient signal strength with the entering mobile station to establish a voice channel. The system also includes means for measuring signal strength between each base station of the candidate set of base stations and each operating mobile station served by each base station. Additionally, the system also includes means for determining which base station of the candidate set of base stations has the weakest signal strength with one of its served operating mobile stations. The system also includes means for reallocating a channel element from the served operating mobile station with the weakest strength to the entering mobile station.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is a system and method in a radio telecommunications network for allocating channel elements in a code division multiple access (CDMA) radio telecommunications network operating in the macro-diversity mode.

Figure 1:
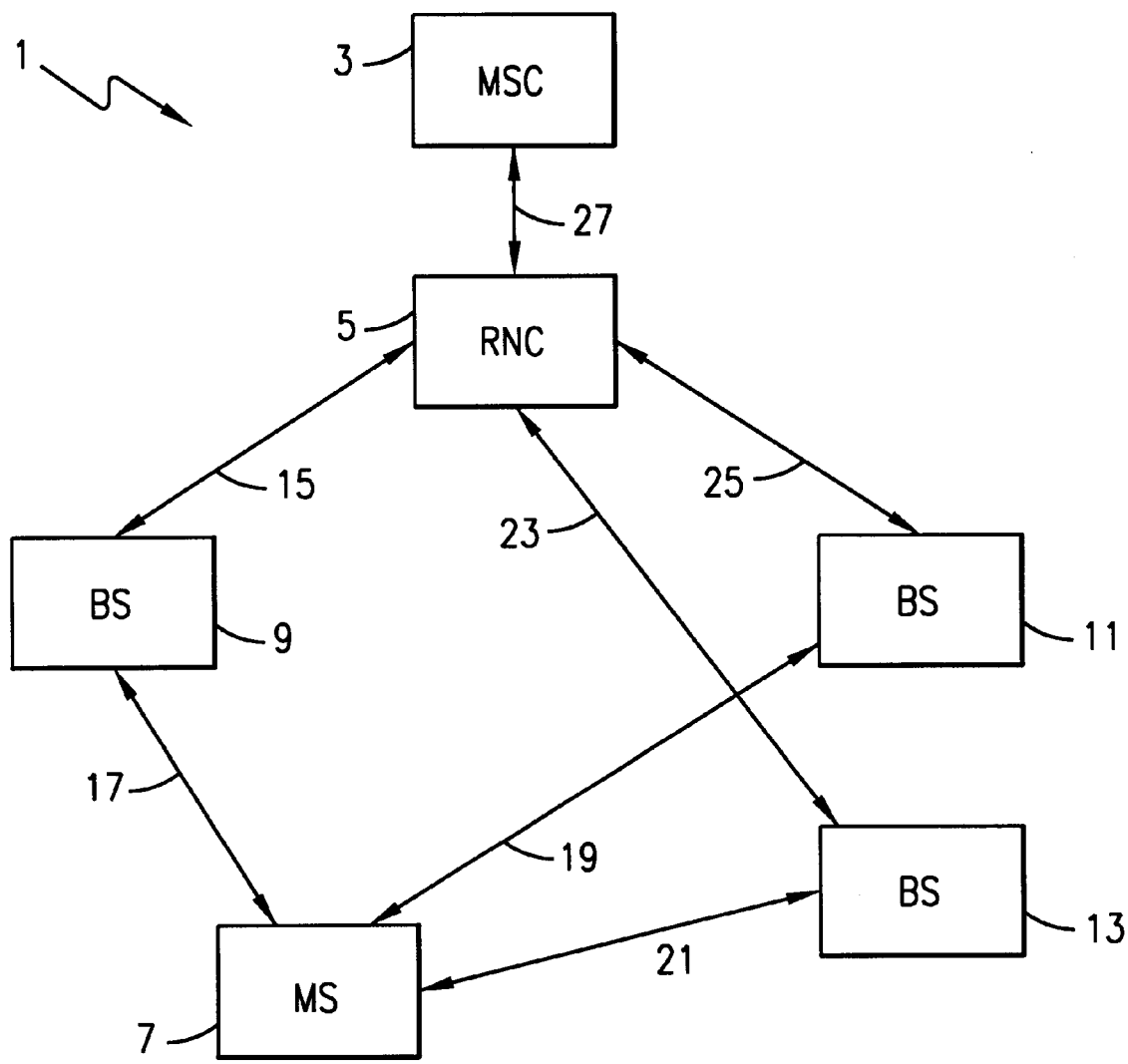
FIG. 1 (Prior Art) is a simplified block diagram illustrating the components of an existing radio telecommunications CDMA network utilizing the macro-diversity mode.

FIG. 1 is a simplified block diagram illustrating the components of an existing radio telecommunications network 1 utilizing the macro-diversity mode. The radio telecommunications network 1 includes a mobile switching center (MSC) 3, a radio network controller (RNC) 5, a mobile station (MS) 7, a base station (BS) 9, a BS 11, a BS 13, and communications links 15–27.

The MSC 3 is a switching center providing all the necessary switching functions in the existing radio telecommunications network 1.

The MS 7 roams through the coverage area of the MSC 3. The MS 7 communicates within the radio telecommunications network 1 through the MSC 3 via one of the BSs.

The RNC 5 controls the radio telecommunications network 1. The RNC 5 may either be co-located with the MSC 3 or remotely located away from the MSC 3. The RNC 5 maintains control of the flow of data by receiving the data on a frame by frame basis for both the uplink and the downlink.

In the existing radio telecommunications network 1, the RNC 5 and the MSC 3 interface and provide system control to the base stations. The RNC 5 may be connected to the MSC 3 by various means such as dedicated landlines, optical fiber links or by microwave communication links. The BS 9, 11, and 13 are exemplary of the base stations found in a radio telecommunications network 1. The base stations cover a specific service area or cell designed in geographic shapes such that the MS 7 will normally be closest to one of the base stations.

Each base station transmits a pilot signal to the MS 7 via a respective communications link 17, 19, or 21. The MS 7 searches for pilot signals on the current CDMA frequency assignment to detect the presence of CDMA channels and to measure their strengths. When the MS 7 detects a pilot signal of sufficient strength that is not associated with any of the channel elements (transceivers) assigned to it, the MS 7 sends a pilot strength measurement message to the BS transmitting the pilot signal. The BS then assigns a channel element associated with that pilot signal to the mobile station and directs the mobile station to perform a handoff. For example, the MS 7 receives pilot signals from BSs 9–13 via communications links 17–21, respectively. In a CDMA system not utilizing the macro-diversity, the MS 7 would transmit through the base station with the strongest pilot signal. However, when the CDMA system uses the macro-diversity mode, the CDMA system will employ the simultaneous use of two or more base stations enabling a greater clarity in the call. In the example where the CDMA system uses the macro-diversity mode, the MS 7 uses the base stations with pilot signals meeting a certain predetermined threshold for signal strength.

In order to facilitate the processing of the search for pilot signals, four sets of pilot signals are defined. First, an active set defines the base station(s) through which the MS 7 communicates. Second, a candidate set identifies the base station(s) in which the pilot signals have been received at the MS 7 with sufficient signal strength to make the base stations members of the active set, but have not been placed in the active set by the MS 7. A neighbor set is defined as the base station(s) which are likely candidates for the establishment of communication with the MS 7. Finally, a fourth (remaining) set identifies the base station(s) having all other possible pilot signals, excluding the pilot signals in the neighbor set, the candidate set and the active set.

The soft handoff process in the radio telecommunications network 1 in the macro-diversity mode occurs when the MS 7 determines that a neighboring base station transmits a pilot signal of sufficient signal strength to meet the signal threshold. The MS 7 transmits a measurement message to the current serving base station, for example, BS 9 via communications link 17. The BS 9 relays this information to the RNC 5 via communications link 15. The RNC 5 responds by connecting the call to the neighboring base station, for example, BS 11. The MS 7 then combines the two signals from BS 9 and BS 11 for a clearer signal which avoids fading as compared to a CDMA system not employing the macro-diversity mode. The BS 9 and BS 11 are now in the active set. The macro-diversity mode continues for as long as signals received from both BS 9 and BS 11 are of a sufficient level to permit good quality demodulation, or are otherwise terminated by the RNC 5.

If a third base station's (for example, BS 13) pilot signal becomes stronger than one of the original two base stations, BS 9 and BS 11, a message indicating the strength of the pilot signal from BS 13 is sent to the RNC 5, through either BS 9 or BS 11. The RNC 5 may then discontinue the use of the weaker signal of one of the base stations, BS 9 or BS 11, and replace the signal with the stronger signal present in BS 13. Likewise, if the MS 7 is capable of receiving more than two base stations' signals, more base stations may be employed in the macro-diversity mode.

Figure 2:
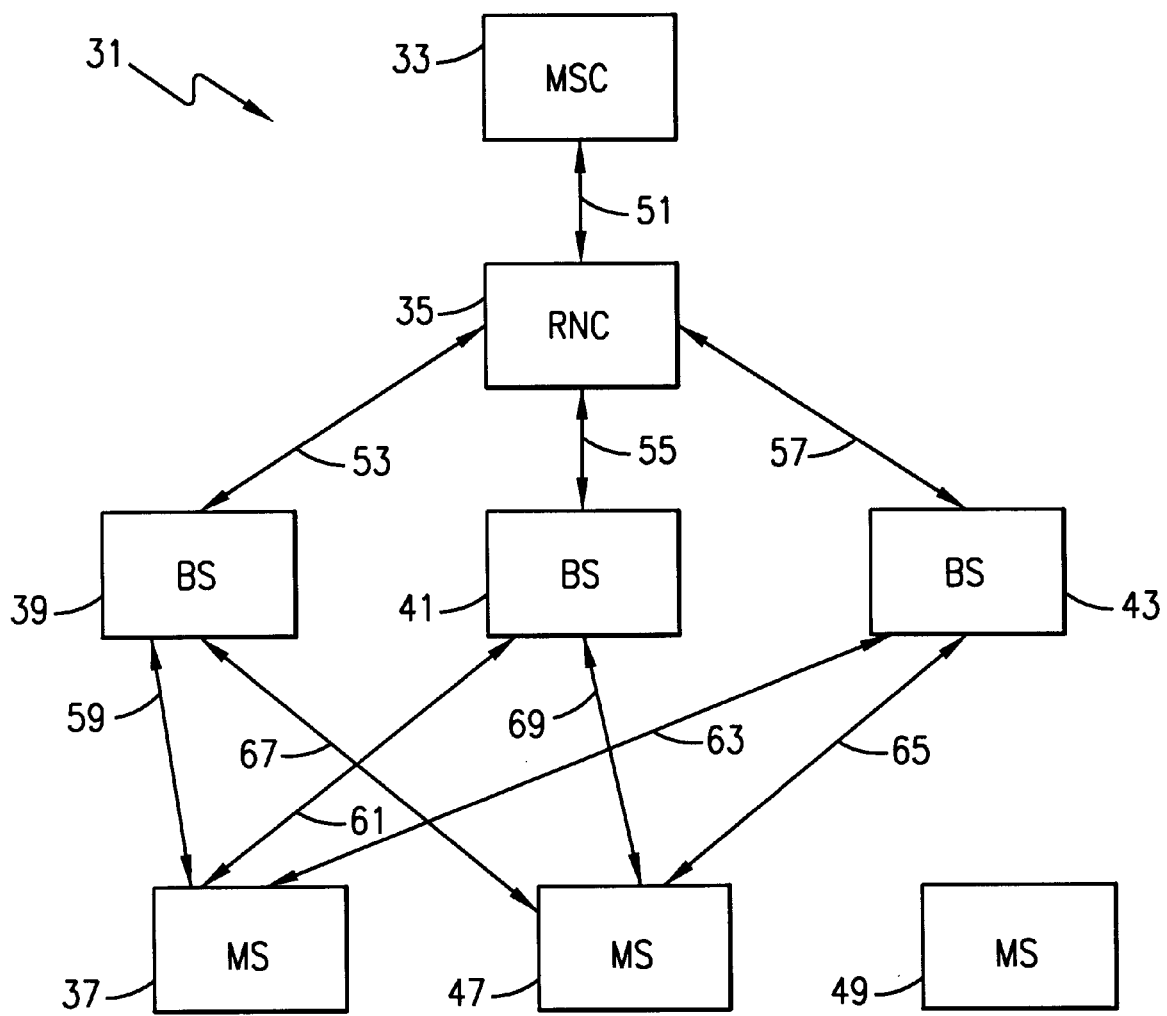
FIG. 2 (Prior Art) is a simplified block diagram of a CDMA radio telecommunications network in the macro-diversity mode in a filly loaded capacity.

However, the use of multiple base stations is limited by the resources available within the base stations. FIG. 2 is a simplified block diagram of a CDMA radio telecommunications network 31 in the macro-diversity mode in a fully loaded capacity. The radio telecommunications network 31 includes a MSC 33, a RNC 35, a MS 37, a BS 39, a BS 41, a BS 43, a MS 47, a MS 49, and communications links 51–69. The base stations have a finite number of transceivers for communications with a plurality of mobile stations. Therefore, when the resources of a particular base station are utilized completely, no further mobile stations may utilize that base station's resources in the existing system without releasing another call. For simplicity of illustration, in the example depicted in FIG. 2, the BSs 39, 41, and 43 are each capable of transmitting and receiving signals to two different mobile stations. Of course, in actual practice, this number would be much greater. The MS 37 is utilizing three base stations, BS 39, 41, and 43 in the macro-diversity mode. Additionally, MS 47 is utilizing three base stations, BS 39, 41, and 43 in the macro-diversity mode. In this configuration, the CDMA system is fully loaded and will not allow any additional mobile stations to operate. Therefore, MS 49 cannot use the radio telecommunications network 31.

Figure 3:
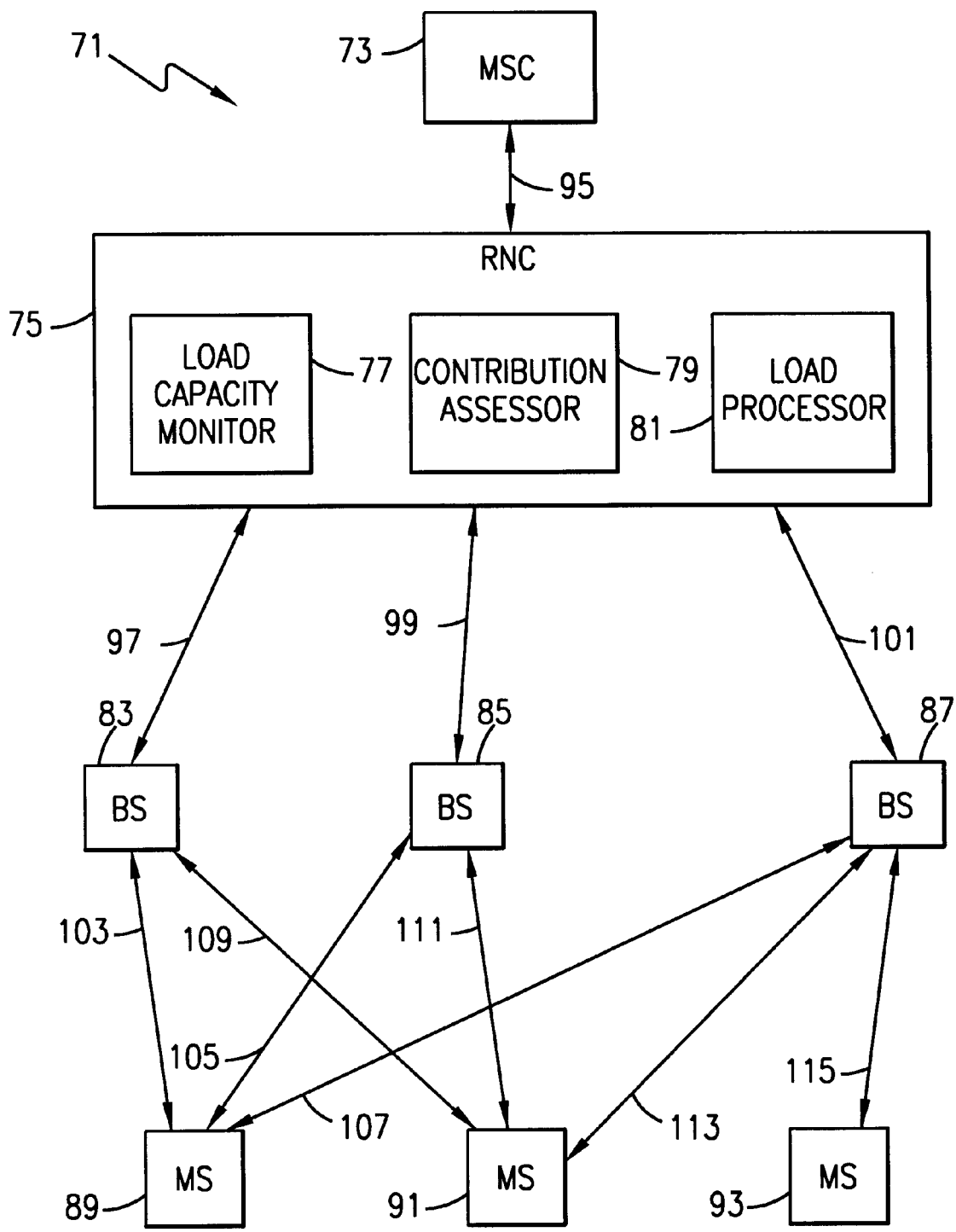
FIG. 3 is a simplified block diagram of a CDMA radio telecommunications network reallocating channel elements in a fully loaded capacity according to the teachings of the present invention.

FIG. 3 is a simplified block diagram of a CDMA radio telecommunications network 71 accommodating an additional mobile station in a fully loaded capacity utilizing the macro-diversity mode according to the teachings of the present invention. The radio telecommunications network 71 includes a MSC 73, and a RNC 75 having a load capacity monitor 77, a contribution assessor 79, and a load processor 81. The radio telecommunications network 71 also includes BSs 83–87, MSs 89–93, and communications links 95–115. The communications links 95–115 refers to channels necessary to communicate between the various nodes in the radio telecommunications network 71.

The MSC 73 is a switching center providing all the necessary switching functions in the existing radio telecommunications network 71.

The MS 89, MS 91, and MS 93 roam through the coverage area of the MSC 73. The MS 89, MS 91, and MS 93 communicate within the radio telecommunications network 71 through the MSC 73. The use of three mobile stations and three base stations is exemplary only. The radio telecommunications network 71 may have a greater or lessor number of base stations and mobile stations operating within the radio telecommunications network 71.

The RNC 75 controls the radio telecommunications network 71. The RNC 75 may either be co-located with the MSC 73 or remotely located away from the MSC 73. In the example depicted in FIG. 3, the RNC 75 is located away from the MSC 73. The RNC 75 maintains control of the flow of data by receiving the data on a frame by frame basis for both the uplink and the downlink. The RNC 75 controls which base stations provide coverage for each mobile station using the radio telecommunications network 71. The load capacity monitor 77 monitors the load on each base station by mobile stations upon the radio telecommunications network 71. Additionally, the contribution assessor 79 determines the least contributing base station to the current mobile stations users of the radio telecommunications network 71. The load processor 81 terminates and establishes links between operating mobile stations and the BSs 83–87 via communications links 103–115. The RNC 75 dynamically allocates communications links by terminating the connection of the least significant contributing base station by the currently operating mobile stations and connecting an additional mobile station to the terminated base station connection when the radio telecommunications network 71 is in a loaded capacity.

In the radio telecommunications network 71, the RNC 75 and the MSC 73 interface and provide system control to the base stations. The RNC 75 may be connected to the MSC 73 by various means such as dedicated landlines, optical fiber links or by microwave communication links. The base stations cover a specific service area or cell designed in geographic shapes such that the MS 89, the MS 91, and the MS 93 will all be closest to one of the base stations. Each base station transmits a pilot signal to the MS 89, the MS 91, and the MS 93. The pilot signals are transmitted to the MS 89, the MS 91, and the MS 93 from the respective base stations via communications links 103–115. The MS 89, the MS 91, and the MS 93 each search for pilot signals on the current CDMA frequency assignment in order to detect the presence of CDMA channels and to measure their strengths. Whenever a mobile station detects a pilot signal of sufficient strength that is not associated with any of the forward traffic channels assigned to it, the MS sends a pilot strength measurement message to the corresponding BS. The BS then assigns a channel element associated with that pilot signal to the mobile station and directs the mobile station to perform a handoff. For example, the MS 89 receives pilot signals from BS 83, BS 85, and BS 87 via communications links 103, 105, and 107, respectively. When the CDMA system uses the macro-diversity mode, the CDMA system will employ the simultaneous use of two or more base stations enabling a greater clarity in the call. In the example where the CDMA system uses the macro-diversity mode, the MS 89 uses the base stations with pilot signals meeting a certain predetermined threshold for signal strength.

The soft handoff process in the radio telecommunications network 71 in the macro-diversity mode occurs, for example, when the MS 89 determines that a neighboring BS 85 is transmitting a pilot signal of sufficient signal strength to meet the signal threshold. The MS 89 transmits the measurement message to the current serving BS 83 via communications link 103. The BS 83 relays this information to the RNC 75 via communications link 97. The RNC 75 responds by utilizing the new base station, BS 85. The MS 89 then combines the two signals from BS 83 and BS 85 for a clearer signal which avoids fading as compared to a CDMA system not employing the macro-diversity. The macro-diversity mode continues for as long as signals received from both BS 83 and BS 85 are of a sufficient level to permit good quality demodulation, or otherwise terminated by the RNC 75.

If a third base station's (BS 87) pilot signal becomes stronger than one of the original two base stations, BS 83 and BS 85, a message indicating the strength of the pilot signal from BS 87 is sent to the RNC 75, through either BS 83 or BS 85. The RNC 75 may then discontinue the use of the weaker signal of one of the base stations, BS 83 or BS 85, and replace the signal with the stronger signal present in BS 87. Likewise, if the MS 89 is capable of receiving more than two base stations' signals, more base stations may be employed in the macro-diversity mode.

However, the use of multiple base stations is limited by the resources available by the base stations. The base stations have a certain number of transceivers for communications with a multitude of mobile stations. In order to allow an additional user to use the radio telecommunications network 71, the base station resources must be shifted.

While still referring to FIG. 3, the MS 89 and MS 91 are each capable of operating with three BSs in the macro-diversity mode, and are fully utilizing all of the resources of the radio telecommunications network 71. In this example, the BS 83 and BS 85 each have two transceivers (channel elements) and are therefore each limited to serving only two mobile stations. The MS 89 is utilizing BS 83, 85, and 87, while in the macro-diversity mode. Additionally, the MS 91 is utilizing BS 83, 85, and 87. A situation may arise when an additional user, MS 93, desires to use the radio telecommunications network 71. The load capacity monitor 77 monitors the calls in the macro-diversity mode and determines when the radio telecommunications network 71 is in a fully loaded capacity. When the load capacity monitor 77 determines that the radio telecommunications network 71 is fully loaded, the contribution assessor 79 determines which base stations are within the candidate set of base stations for the MS 93. Then, the contribution assessor 79 determines which base station is the least significant contributor to MS 89 and MS 91. For example, the contribution assessor 79 determines that the BS 87 is the least significant contributor to MS 89. The contribution assessor 79 determines the least significant contributor of the base stations by determining the weakest signal strength between the current mobile stations (MS 89 and MS 91) and the operating base stations (BSs 83, 85, and 87) which are capable of serving the additional MS 93 (i.e., within the MS 93's candidate set). The load processor 81 then disconnects the weakest link (e.g., link 107) to MS 89. Next, the load processor 81 enables the MS 93 to use BS 87 by allocating the newly available channel element between the MS 93 and the BS 87. Therefore, an additional subscriber is accommodated in the fully loaded radio telecommunications network 71, without terminating the currently operating calls. Although in this example, the MS 93 is utilizing one base station, BS 87, in other situations, the MS 93 could employ the use of a plurality of base stations in the macro-diversity mode.

Alternately, rather than waiting for the RNC 75 to determine that another user wishes to use the radio telecommunications network 71, the MS 93 can alert the RNC 75 that an emergency call is needed. The MS 93 alerts the load capacity monitor 77 by transmitting a signal to indicate that the call is an emergency call, for example, sending the signal "911." The signal is transmitted to the MSC 73 and relayed to the load capacity monitor 77 via the communications link 95. If the load capacity monitor 77 determines that the radio telecommunications network 71 is fully loaded, the contribution assessor 79 responds by determining which base stations are within the candidate set of base stations for MS 93. Then, the contribution assessor 79 determines the least significant contributor within the candidate set of base stations for MS 93. MS 89 and MS 91 are both served mobile stations of the base stations within the candidate set of MS 93. In this example, the BS 87 is determined to be the least significant contributor to the MS 89 and MS 91. The load processor 81 then removes the BS 87 from the connection to the MS 89. The RNC 75 provides a channel element from the BS 87 resources to the MS 93, thus providing the MS 93 with a call connection.

Figure 4:
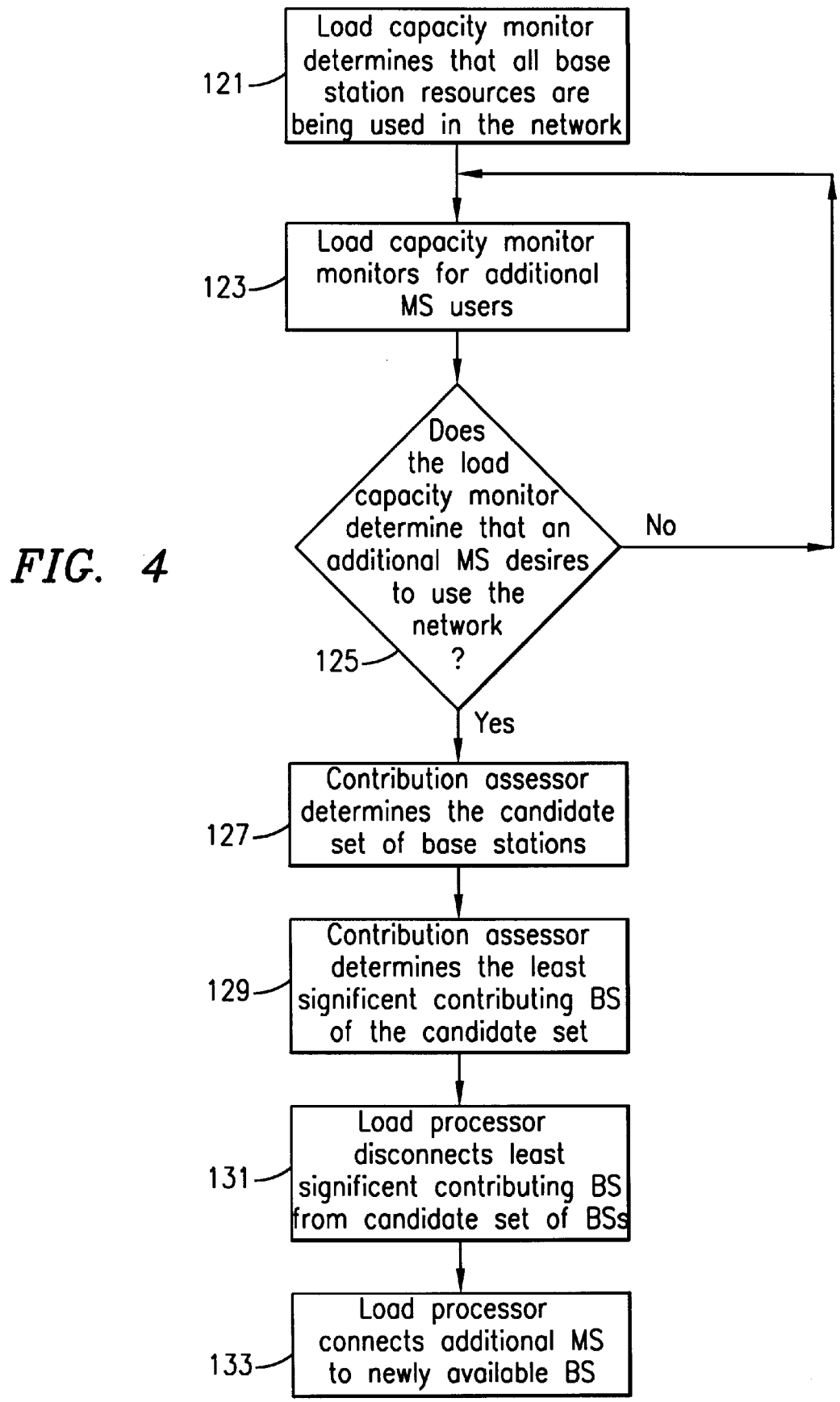
FIG. 4 is a flow chart outlining the steps of the method of the present invention for dynamically allocating channel elements to an entering mobile station in a fully loaded CDMA radio telecommunications network in the macro-diversity mode.

FIG. 4 is a flow chart outlining the steps for reallocating a channel element to an entering mobile station in a fully loaded CDMA radio telecommunications network in the macro-diversity mode. With reference to FIGS. 3 and 4, the steps of the method will now be described. Beginning with step 121, the load capacity monitor 77 determines that all the base station resources of the radio telecommunications network 71 are being used in the macro-diversity mode. Next, in step 123, the load capacity monitor monitors the radio telecommunications network 71 for additional mobile station users. In step 125, it is determined whether or not the load capacity monitor 77 recognizes that an additional mobile station desires to use the radio telecommunications network 71. The RNC 75, through the load capacity monitor 77, may determine the existence of another mobile station by monitoring the radio telecommunications network 71 for use by other mobile stations. If the load capacity monitor 77 determines that there are no additional mobile stations desiring to use the radio telecommunications network 71, the method moves back to step 123, where the load capacity monitor 77 continues to monitor for additional mobile station users. If, however, the load capacity monitor 77 determines that an additional mobile station desires to use the network 71, the method moves from step 125 to step 127 where the contribution assessor 79 determines a candidate set of base stations for MS 93. Next, in step 129, the contribution assessor 79 determines the least significant contributing base station for the current mobile station users (MS 89 and MS 91) within the candidate set of MS 93 (BSs 83–87). In this example, communications link 107 is the weakest signal.

Next, in step 131, the load processor 81 disconnects the least significant contributing base station, for example BS 87, from the current mobile station user, MS 89. The contribution assessor 79 determines the least significant contributor of the base stations by determining the weakest signal strength between the current mobile stations (MS 89 and MS 91) and the operating base stations within the candidate set of MS 93 (BSs 83, 85, and 87). Then, in step 133, the load processor 81 connects the additional MS user, MS 93, to the newly available BS 87 by assigning a channel element associated with BS 87. The radio telecommunications network 71 is then able to accommodate the additional MS 93 in a fully loaded situation in a macro-diversity mode.

Figure 5:
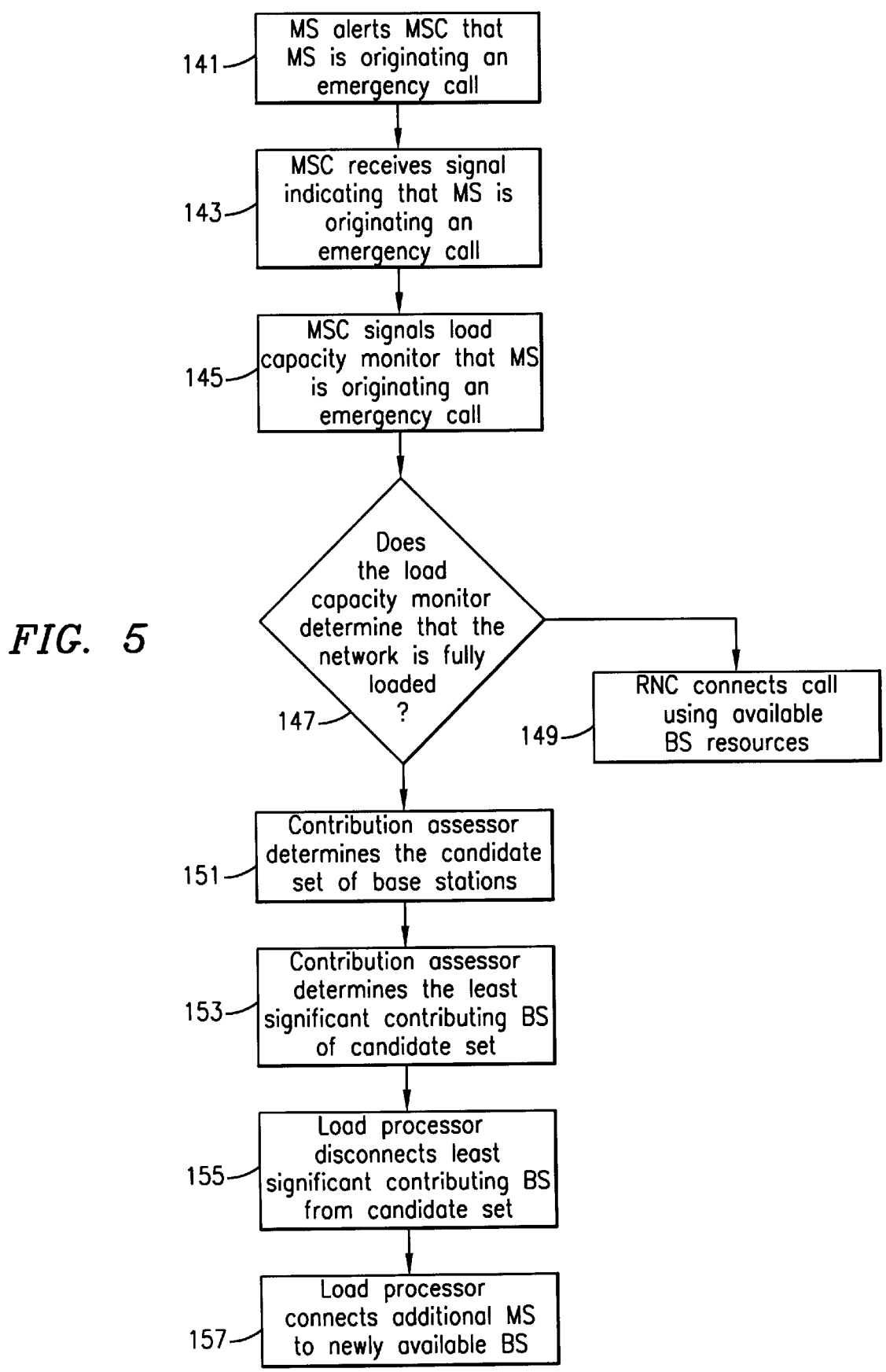
FIG. 5 is a flow chart outlining the steps of the method of the present invention for reallocating channel elements for an emergency call in a fully loaded CDMA radio telecommunications network in the macro-diversity mode.

FIG. 5 is a flow chart outlining the steps of the method of the present invention for allocating a channel element for an emergency call in a fully loaded CDMA radio telecommunications network in the macro-diversity mode. With reference to FIGS. 3 and 5, the steps of the method will now be described. Beginning with step 141, the MS 93 originates an emergency call. The MS 93 alerts the MSC 73 that the call is an emergency by inputting a signal, such as "911." Next, in step 143, the MSC 73 receives the signal indicating that the MS 93 is originating an emergency call. In step 145, the MSC 73 signals the load capacity monitor 77 that the MS 93 is originating an emergency call. Then, in step 147, it is determined whether or not the load capacity monitor 77 recognizes that the radio telecommunications network 71 is fully loaded. If the load capacity monitor 77 determines that the radio telecommunications network 71 is not fully loaded, the method moves to step 149, where the RNC 75 connects the emergency call from the MS 93 using available base station resources. If, however, the load capacity monitor 77 determines that the radio telecommunications network 71 is fully loaded, the method moves from step 147 to step 151 where the contribution assessor 79 determines a candidate set of base stations for MS 93. Next, in step 153, the contribution assessor 79 determines the least significant contributing base station for the current mobile station users (MS 89 and MS 91) from the candidate set of MS 93. In this example, BSs 83–87 are within the candidate set for MS 93.

Next, in step 155, the load processor 81 releases the least significant contributing base station, for example BS 87, from the current mobile station user, MS 89. The contribution assessor 79 determines the least significant contributor of the base stations by determining the weakest signal strength between the current mobile stations (MS 89 and MS 91) and the operating base stations (BSs 83, 85, and 87) which are capable of serving the additional MS 93. In this example, communications link 107 has the weakest signal strength. Then, in step 155, the load processor 81 connects the emergency caller, MS 93, to the newly available BS 87 by assigning a channel element associated with BS 87. The radio telecommunications network 71 is then able to accommodate the emergency call from MS 93 in a fully loaded situation in a macro-diversity mode.

It is thus believed that the operation and construction of the present invention will be apparent from the foregoing description. While the method and system shown and described have been characterized as being preferred, it will be readily apparent that various changes and modifications could be made therein without departing from the spirit and scope of the invention as defined in the following claims.

What is claimed is:

1. A method of dynamically allocating a channel element to an entering mobile station entering a fully loaded code division multiple access (CDMA) radio telecommunications network having a plurality of base stations serving a plurality of operating mobile stations, said radio telecommunications network utilizing macro-diversity to provide duplicate channel elements to each operating mobile station, said method comprising the steps of:

determining a candidate set of base stations having sufficient signal strength with said entering mobile station to establish a voice channel;

measuring signal strength between each base station of said candidate set of base stations and each operating mobile station served by each base station of said candidate set;

determining which base station of said candidate set of base stations has a weakest signal strength with one of its served operating mobile stations;

disconnecting, by a load processor which controls said plurality of base stations, a channel element from said served operating mobile station with said weakest signal strength to the determined base station; and reallocating the disconnected channel element to said entering mobile station.

2. The method of claim 1 wherein said step of reallocating a channel element includes connecting, by said load processor, a channel element from said base station having said weakest signal strength to said entering mobile station.

3. The method of claim 2 wherein said step of determining which base station of said candidate set of base stations has a weakest signal strength includes assessing, by a contribution assessor, which base station of said candidate set of base stations has said weakest signal strength.

4. The method of claim 3 further comprising, before the step of determining a candidate set of base stations, the step of determining whether said radio telecommunications network is fully loaded by a load capacity monitor.

5. The method of claim 4 wherein said step whether said radio telecommunications network is fully loaded by a load capacity monitor includes monitoring, by said load capacity monitor, for additional entering mobile stations.

6. A method of dynamically allocating a channel element for an emergency call to an entering mobile station entering a fully loaded code division multiple access (CDMA) radio telecommunications network having a plurality of base stations serving a plurality of operating mobile stations, said radio telecommunications network utilizing macro-diversity to provide duplicate channel elements to each operating mobile station, said method comprising the steps of:

alerting, by said entering mobile station, that said emergency call is originating in said radio telecommunications network;

determining a candidate set of base stations having sufficient signal strength with said entering mobile station to establish a voice channel;

measuring signal strength between each base station of said candidate set of base stations and each operating mobile station served by each base station of said candidate set;

determining which base station of said candidate set of base stations has a weakest signal strength with one of its served operating mobile stations; disconnecting, by a load processor which controls said plurality of base stations, a channel element from said served operating mobile station with said weakest signal strength to the determined base station; and reallocating the disconnected channel element to said entering mobile station.

7. The method of claim 6 wherein said step of reallocating a channel element includes connecting, by said load processor, a channel element from said base station having said weakest signal strength to said entering mobile station.

8. The method of claim 7 wherein said step of determining which base station of said candidate set of base stations has a weakest signal strength includes assessing, by a contribution assessor, which base station of said candidate set of base stations has said weakest signal strength.

9. A system for dynamically allocating a channel element to an entering mobile station entering a fully loaded code division (CDMA) radio telecommunications network having a plurality of base stations serving a plurality of operating mobile stations, said radio telecommunications network utilizing macro-diversity to provide duplicate channel elements to each operating mobile station, said system comprising:

means for determining a candidate set of base stations having sufficient signal strength with said entering mobile station to establish a voice channel;

means for measuring signal strength between each base station of said candidate set of base stations and each operating mobile station served by each base station;

means for determining which base station of said candidate set of base stations has the weakest signal strength with one of its served operating mobile stations;

a load processor for disconnecting a channel element from said served operating mobile station with said weakest signal strength to the determined base station; and means for reallocating the disconnected channel element to said entering mobile station.

10. The system of claim 9 wherein said means for reallocating a channel element includes said load processor for connecting said channel element from said base station having said weakest signal strength to said entering mobile station.

11. The system of claim 10 wherein said means for determining which base station of said candidate set of base stations has a weakest signal strength includes a contribution assessor for assessing which base station of said candidate set of base stations has said weakest signal strength.

12. The system of claim 11 further comprising means for determining whether said radio telecommunications network is fully loaded.

13. The system of claim 9 further comprising means for alerting said radio telecommunications network that said entering mobile station is originating an emergency call.

* * * * *